United States Patent [19]

Cordova et al.

[11] 4,391,059
[45] Jul. 5, 1983

[54] AUTOMATIC FISH HOOK SETTER

[75] Inventors: Samuel Cordova, Denver, Colo.; Robert J. Spitz, 1548 S. Gray, Lakewood, Colo. 80226

[73] Assignee: Robert J. Spitz, Lakewood, Colo.

[21] Appl. No.: 253,065

[22] Filed: Apr. 10, 1981

[51] Int. Cl.³ ............................................. A01K 97/00
[52] U.S. Cl. .......................................... 43/15; 43/16
[58] Field of Search ...................................... 43/15, 16

[56] References Cited

U.S. PATENT DOCUMENTS

| 2,918,746 | 12/1959 | Hamrick | 43/15 |
| 3,412,499 | 11/1968 | Pastrovich, Sr. | 43/15 |
| 3,453,765 | 7/1969 | Gibbons | 43/15 |
| 3,699,701 | 10/1972 | Jacobs | 43/15 |
| 3,762,090 | 10/1973 | Nelson et al. | 43/15 |
| 3,832,794 | 9/1974 | Encinias | 43/15 |
| 3,837,109 | 9/1974 | DeJulio | 43/15 |
| 3,914,894 | 10/1975 | Koboza | 43/15 |

Primary Examiner—Nicholas P. Godici
Assistant Examiner—Kurt Rowan
Attorney, Agent, or Firm—Bruce G. Klaas

[57] ABSTRACT

A fishing pole holder for use during fishing having a spring biased tube for the pole handle, and a latch for holding the tube in cocked position with a release trigger activated by a fish line, when a fish takes the bait at the end of line.

4 Claims, 4 Drawing Figures

U.S. Patent
Jul. 5, 1983
4,391,059
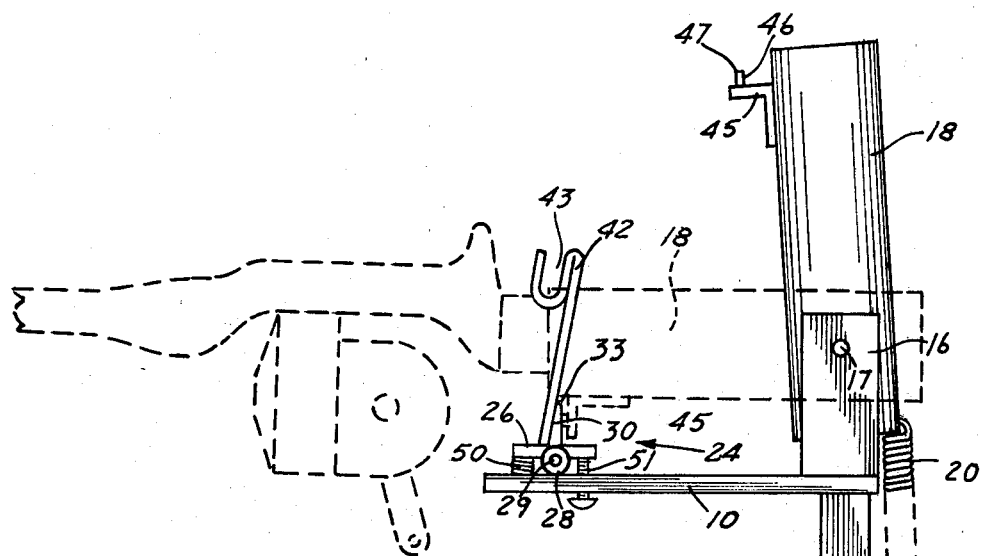
FIG. 1
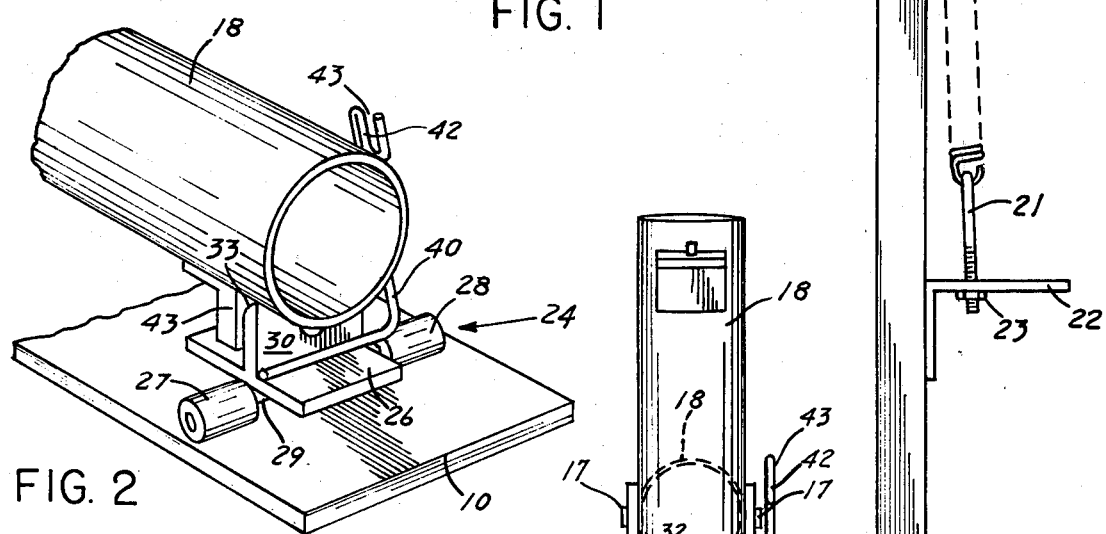
FIG. 2
FIG. 4
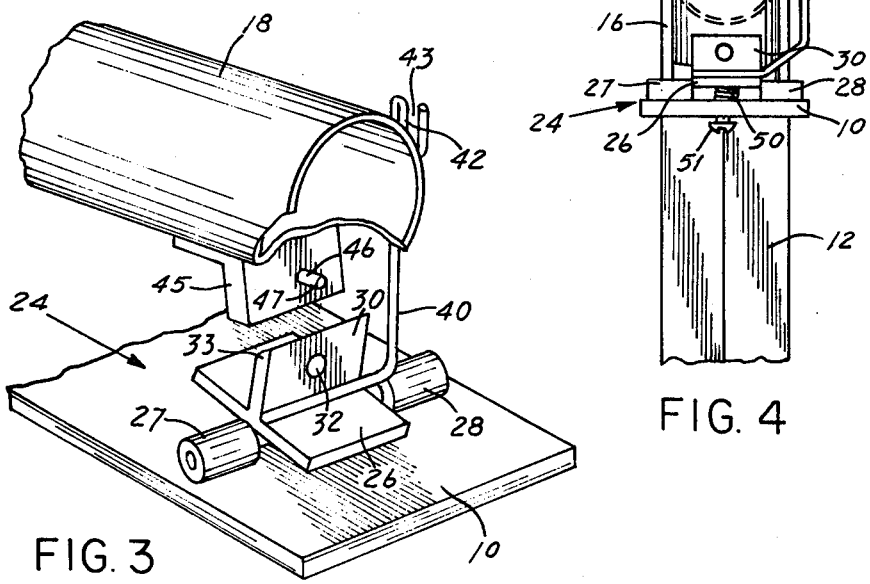
FIG. 3

AUTOMATIC FISH HOOK SETTER

BACKGROUND OF THE INVENTION

1. Field of the Invention

The invention relates to so called automatic fishing devices, which are held in the ground by a spike or secured to a boat's gunwale, in which a pole is held against a spring bias which tends to pull the pole from a position toward the water to a position away from the water, and a trigger activated by a fish tugging on the line to release the rod.

2. Prior Art

There are many patents on automatic fishing devices, and they all have some parts in common. The automatic fishing devices all have some type of frame for setting in the earth or mounting on a firm base, e.g. a boat's gunwale. The devices have a pole holder, usually a tube, and a spring biasing the pole holder upright, away from the water. Each device includes a latch to secure the pole holder down and under spring tension and means for releasing the latch so that the pole is pivoted away from the water. The following patents are representative of the prior art, with a discussion of the latch and release means.

Hamrick U.S. Pat. No. 2,918,746 dated Dec. 29, 1959 shows a latch formed of an arm fitting in a notch. A cam pivots to push the arm out of the notch, and an arm on the cam has the fish line looped over it so that a fish pulling on the line triggers the unit.

Pastrovich, Sr. U.S. Pat. No. 3,412,499 dated Nov. 26, 1968 has a middle pivoted arm with the upper arm end having a notch for fitting over a pin holding the pole holder. The opposed end of the arm has a line holder so that pulling on the line releases the notch from the pin to activate the spring biased pole holder.

Gibbons, U.S. Pat. No. 3,453,765 dated July 8, 1969 has an upright trigger around which the fish line is wound, to actuate a train of cams and dogs to release a latch between the pole holder and frame, releasing the spring biased unit to pivot away from the water.

Jacobs U.S. Pat. No. 3,699,701 dated Oct. 24, 1974 shows a pivoted eye, which pivots on a tug from the fish line, and an elongated trigger mounted alongside the pole holding tube. Lost motion eyelet means are necessary for the trigger as it is pivoted on a different pivot than the pole tube.

Nelson U.S. Pat. No. 3,762,090 dated Oct. 2, 1973 includes a long trigger which extends above the pole from the frame and the fish line is held in a hook on the end of the trigger. The trigger is pivoted laterally by the line to move the trigger out of a laterally position U-form bracket.

Encinias U.S. Pat. No. 3,832,794 dated Sept. 3, 1974 uses a bail on the pole tube which is pivoted in a peripheral frame. A trigger with a hook holds a mouse trap type spring loaded bail which flips over when the trigger is released to release the spring biased pole tube permitting it to pivot upwardly.

De Julio U.S. Pat. No. 3,837,109 dated Sept. 24, 1974 uses a pivoted wire hook that is moved over a pin mounted on the pole tube. A fish line looped over the wire hook pulls it off the pin releasing the spring biased pole tube.

Koboza U.S. Pat. No. 3,914,894 dated Oct. 24, 1975 uses a jointed arm to hold the pole tube in straightened position and release the tube when bent. The movement of the pole releases the arm.

Each of the prior art references require the use of two hands to "cock" the pole holder, and secure the latching mechanism, making its use difficult for handicaps, elderly, etc.

3. The Present Invention

The present invention provides an improvement in automatic fishing devices by providing a latch and trigger assembly which permits cocking and latching the pole tube with one hand, and provides a positive latch release on a pull from the fish line mounted around the trigger. The latch is lightly spring loaded, latch plate with a pin hole, and the trigger is rigidly secured to and pivots with the latch plate. A latch pin with a sloped latching surface is mounted on the pole holder in position to mate the pin with latch plate whereby the sloped pin surface, on depressing the pole tube toward the latch plate, mates with a sloped surface on the latch plate, displacing the latch plate so that the pin enters the holding hole. When in cocked position, a tug on the fish line looped over the trigger pivots the latch plate releasing the pole holder.

OBJECTS AND ADVANTAGES OF THE INVENTION

In view of the above, it is among the objects and advantages of the invention to provide a novel latching system for a spring biased pole holder of an automatic fishing device.

Another object of the invention is to provide an improved latching and release system for an automatic fishing device which easily latches with a single hand pressing down on the pole holding tube.

A further object of the invention is to provide an improved latching system for a fish pole holder using a pivoted and lightly spring biased latch plate for mating with and releasing from a pin on the pole holder.

Yet another object of the invention is to provide an improved self latching holder of an automatic fishing pole holder.

These and other objects and advantages may be ascertained by reference to the following description and appended illustrations.

GENERAL DESCRIPTION OF THE ILLUSTRATIONS

FIG. 1 is a side elevational view of a unit utilizing the improved latch/trigger mechanism of the invention, illustrating the cocked position of the pole holder and the sprung position of the holder.

FIG. 2 is a perspective detail of the pole holding tube and the trigger arrangement.

FIG. 3 is a perspective view, partially cut away, of the pole holder and illustrations in detail the latch/trigger mechanism.

FIG. 4 is a front elevational view of the device.

SPECIFIC DESCRIPTION OF THE ILLUSTRATIONS

In the preferred embodiment selected for illustration, the major parts include a base member 10 secured to an earth penetrating support 12, having a pointed end 14. The base member 10 is preferably a steel plate welded to the member 12 which is preferably an angle iron. A U-shaped bracket 16 is secured on one of the end of the base member 10. A pole holding tube 18 is pivotably secured in the upright U-shaped bracket 16 by pivot pins 17. The tube 18 is arranged to pivot from a horizontal position, indicated by broken lines 18 to a generally upright position, shown in solid lines (FIG. 1). A fishing pole (shown in plantom) is positioned in the tube in the horizontal position, and it is to be understood that the pole is in position in the tube when the tube is raised.

A helical spring 20 is secured to one end of the tube by one loop and to a threaded eye bolt 21. The bolt is passed through an opening in an angle bracket 22 welded to the member 12. A nut 23 adjustably supports the spring in the bracket so as to provide a different tension on the pole tube 18, as desired. The pole holder is held in spring biased position (against plate 10) by a pin and pivoted latch plate assembly, shown generally by numeral 24. This unit consists of a latch plate base 26 pivotally secured in pivot rings 27 and 28 by a shaft 29 welded to the middle of the plate 26. This permits the plate 26 to pivot in a narrow arc on base 10.

A latch plate 30 is welded on the plate 26 at a right angle. The latch plate 30 has an elongated opening 32 generally centered in the plate. A sloped surface 33 bevels the top edge of the plate 30 so that it slopes rearwardly. A trigger formed of a wire support 40 is welded to the plate 26 and is turned upright at the outer end. The outer end includes a reverse turned U-shaped member 42 with its open end facing upwardly. The U-shaped end is preferably a reverse turned end of the wire trigger.

A pin plate 45 (which is an angle) is welded to the tube 18 in a position to mate a held pin 46 with the opening 32 in the latch plate 30 when the pole tube is pressed down toward the base 10. The pin has a downwardly directed sloped surface 47 which mates with the sloped surface 33 on the latch plate.

A helical spring 50 biases one edge of the plate 26 rearwardly so that the other edge of the plate rests on adjustable stop 51. This controls the angle of the latch plate 26 so as to be in position to be contacted by the sloped surface on the pin, and control penetration depth of the pin in the opening.

The tube is depressed horizontally and the pin 46 pivots the plate 26 forwardly by the sliding contact of the two sloped surfaces, so that the latch plate is tilted forwardly. When pushed far enough down, the pin leaves the sloped surface 33 and travels down the plate to the opening. The spring 50 pivots the latch plate 30 upright causing the plate hold the pin in the opening 32. This latches the tube in cocked position. A pole may now be inserted in the tube and the fish line looped over the U-shaped end via the opening (which holds the line at the top of the section). A pull on the line pulls the trigger and latch plate forwardly, permitting the pin to leave the opening and releasing the tube so that it resumes its neutral, upright position. The stop 51 is preferably a bolt or screw threaded through the base plate 10 to adjust the depth that the pin 46 penetrates the opening, and therefore the sensitivity of the trigger, i.e. the deeper the penetration the more pull necessary to release the pole tube.

The shape and dimensions are such that the latching means may be easily secured to hold the pole tube in cocked position, by one hand of the user. The latch operates automatically to force the pin to extend into the latch plate opening, setting the unit in cocked position. The sensitivity is very easily adjusted by the bolt 51.

What is claimed is:

1. In an automatic fishing device having a base for securing to a rigid structure, and a pivoted pole holding tube spring biased to an upright position, the improvement of:
   (a) latch/release means arranged to temporarily hold the pole holding tube in downwardly pivoted position,
   (b) said latch/release means including:
      (1) a plate generally centrally mounted for limited pivotal movement on the base and an upright latch plate mounted on said plate and having an aperture therein,
      (2) spring means biasing said plate toward a latching direction,
      (3) stop means limiting the biased pivotal movement of said plate in said latching direction,
      (4) a pin mounted on the pole holding tube positioned to mate with and be held in said aperture in said latch plate,
      (5) the top edge of said latch plate being beveled toward said pin so as to aid the latching of the pole holding tube, and
      (6) trigger means rigidly secured to said latch/release means and having a portion extending beyond said latch plate and generally aligned therewith, said portion extending beyond said latch plate including fish line holding means, whereby said latch/release means permits easy one hand latching of said pole holding tube in a down position under spring bias.

2. The improvement of claim 1, wherein said stop means limiting movement of said plate is a threaded member providing adjustable stop means for changing sensitivity of release of the pole holding tube.

3. The improvement of claim 1, wherein said pin includes a sloped surface mating with the sloped surface of said latch plate.

4. The improvement of claim 1, wherein said pin is mounted in an angle member rigidly secured to the pole holding tube.

* * * * *